United States Patent
Wang et al.

(10) Patent No.: US 11,912,336 B2
(45) Date of Patent: Feb. 27, 2024

(54) REAR SUBFRAME ASSEMBLY

(71) Applicant: GREAT WALL MOTOR COMPANY LIMITED, Hebei (CN)

(72) Inventors: Wei Wang, Hebei (CN); Ming Chi, Hebei (CN); Weidong Ding, Hebei (CN); Yanmeng Song, Hebei (CN); Yonghui Song, Hebei (CN); Zhichao Chen, Hebei (CN); Changjian Cai, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 24 days.

(21) Appl. No.: 17/765,307

(22) PCT Filed: Dec. 22, 2020

(86) PCT No.: PCT/CN2020/138336
§ 371 (c)(1),
(2) Date: Mar. 30, 2022

(87) PCT Pub. No.: WO2021/129614
PCT Pub. Date: Jul. 1, 2021

(65) Prior Publication Data
US 2022/0371661 A1 Nov. 24, 2022

(30) Foreign Application Priority Data

Dec. 27, 2019 (CN) .......................... 201911373664.1

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC ....... B62D 21/11; B62D 21/155; B62D 21/00
See application file for complete search history.

(56) References Cited

U.S. PATENT DOCUMENTS

| 9,975,416 B2 * | 5/2018 | Hara ..................... B62D 25/20 |
| 2007/0024044 A1 * | 2/2007 | Ogawa .................. B62D 21/11 |
| | | 267/293 |

(Continued)

FOREIGN PATENT DOCUMENTS

| CN | 105667595 A | 6/2016 |
| CN | 109131570 A | 1/2019 |

(Continued)

OTHER PUBLICATIONS

First Office Action dated Feb. 5, 2021 corresponding to Chinese application No. 201911373664.1.

(Continued)

*Primary Examiner* — Paul N Dickson
*Assistant Examiner* — Shams Dhanani
(74) *Attorney, Agent, or Firm* — Nath, Goldberg & Meyer; Joshua B. Goldberg

(57) ABSTRACT

The present disclosure relates to a rear sub-frame assembly, applied to an electric vehicle main body, and rear sub-frame assembly comprises a rear sub-frame main body and positioning supports, rear sub-frame main body is bilateral symmetry structure; vehicle body connecting parts connected with rear sub-frame main body on upper portion of rear sub-frame main body, and battery pack guard plate connecting parts connected with rear sub-frame main body on lower portion of rear sub-frame main body are constructed on rear sub-frame main body, stabilizing rod mounting parts, upper control arm mounting parts and lower control arm mounting parts are further arranged on rear sub-frame main body respectively; the quantity of positioning supports respectively arranged close to left end and right (Continued)

end of rear sub-frame main body is two, and positioning parts matched with external positioning members to position rear sub-frame main body are constructed on two positioning supports respectively.

18 Claims, 2 Drawing Sheets

(56) References Cited

U.S. PATENT DOCUMENTS

| | | | | |
|---|---|---|---|---|
| 2015/0273963 | A1* | 10/2015 | Zandbergen | B60G 13/005 280/124.135 |
| 2016/0068036 | A1* | 3/2016 | Minoda | B60G 21/055 280/124.109 |
| 2016/0194029 | A1* | 7/2016 | Kramer | B60G 21/0555 280/124.109 |
| 2017/0174064 | A1* | 6/2017 | Shinoda | B62D 21/02 |
| 2020/0180701 | A1* | 6/2020 | Shin | B60R 19/34 |
| 2020/0361542 | A1* | 11/2020 | Matsuda | B60K 1/04 |
| 2020/0406734 | A1* | 12/2020 | Choi | B60K 1/04 |
| 2021/0178879 | A1* | 6/2021 | Swartzell | B62D 25/2009 |
| 2022/0185098 | A1* | 6/2022 | Yamakawa | B60K 11/06 |
| 2022/0305898 | A1* | 9/2022 | Koshino | B62D 25/2027 |
| 2022/0306206 | A1* | 9/2022 | Kim | B62D 65/024 |

FOREIGN PATENT DOCUMENTS

| | | |
|---|---|---|
| CN | 110001343 A | 7/2019 |
| CN | 110510001 A | 11/2019 |
| CN | 111038588 A | 4/2020 |
| EP | 3266683 A2 | 1/2018 |
| EP | 3543087 A1 | 9/2019 |
| JP | 940387 A | 2/1997 |
| JP | 201424485 A | 2/2014 |

OTHER PUBLICATIONS

International Search Report dated Mar. 18, 2021 corresponding to application No. PCT/CN2020/138336.

* cited by examiner

REAR SUBFRAME ASSEMBLY

CROSS REFERENCE TO RELEVANT APPLICATIONS

This is a National Phase Application filed under 35 U.S.C. 371 as a national stage of PCT/CN2020/138336, filed Dec. 22, 2020, an application claiming the benefit of Chinese patent application filed on Dec. 27, 2019 before the Chinese Patent Office with the application number of 201911373664.1 and the title of "REAR SUBFRAME ASSEMBLY", each of which are incorporated herein in its entirety by reference.

TECHNICAL FIELD

The present disclosure relates to the technical field of vehicle bodies, in particular relates to a rear sub-frame assembly.

BACKGROUND

A sub-frame, usually serving as an intermediate buffer part for connecting a suspension and a vehicle body, plays an important role in a vehicle, and it may isolate vibration and noise, improve comfort, bear various control arm components, and meanwhile bear various forces and torques during vehicle traveling. The sub-frames on the vehicle comprise a front sub-frame and a rear sub-frame, which are located at the front end and the rear end of the vehicle respectively, to form important components of front and rear axles of the vehicle.

At present, along with ever increasing of environmental pressure and continuous development of a new energy vehicle technology, new energy vehicles with power batteries as energy sources are getting more and more recognition of people. However, taking the rear sub-frame in the vehicle as an example, the rear sub-frame of the existing new energy vehicle type is large in external dimension, heavy in weight, and not beneficial to whole vehicle endurance due to unreasonable structural design, the existing rear sub-frame is usually connected with the vehicle body in a fastened manner only by four mounting points, and no more fixing structures are arranged between the rear sub-frame and the vehicle body, which is not conducive to improving the lateral height and operational stability of the whole vehicle.

SUMMARY

By this, the present disclosure aims at providing a rear sub-frame assembly, which is easy to form, compact in structure and light in weight, and has more fixing structures.

In order to achieve the above objectives, the technical solution of the present disclosure is achieved as follows:

A rear sub-frame assembly, applied to an electric vehicle body, and wherein the rear sub-frame assembly comprises:
  a rear sub-frame main body, wherein the rear sub-frame main body is arranged as a bilateral symmetry structure, wherein vehicle body connecting parts connected with the rear sub-frame main body on an upper portion of the rear sub-frame main body, and battery pack guard plate connecting parts connected with the rear sub-frame main body on a lower portion of the rear sub-frame main body are constructed on the rear sub-frame main body; and stabilizing rod mounting parts, upper control arm mounting parts and lower control arm mounting parts are further arranged on the rear sub-frame main body respectively; and
  positioning supports, wherein the quantity of the positioning supports respectively arranged close to a left end and a right end of the rear sub-frame main body is two, and positioning parts matched with external positioning members to position the rear sub-frame main body are constructed on the two positioning supports respectively.

Further, the rear sub-frame main body comprises a rear sub-frame body located in a middle part, and rear sub-frame cross beams and stabilizing rod mounting supports which are arranged on the two opposite sides of the rear sub-frame body respectively, and the rear sub-frame main body further comprises lower supports connecting disposed arranged between the rear sub-frame cross beams on the two sides and the rear sub-frame body respectively in a connected manner; and the positioning supports at the two ends are fixedly connected to the stabilizing rod mounting supports at the corresponding ends respectively.

Further, the rear sub-frame body is provided with a rear sub-frame front plate and a rear sub-frame rear plate which are fixedly connected together in a lapped way, the rear sub-frame cross beams on the two sides are both fixedly connected with the rear sub-frame front plate in a lapped way, and the lower supports on the two sides are both fixedly connected between the rear sub-frame front plate and the rear sub-frame cross beams on the corresponding sides.

Further, inner reinforcing plates are fixedly connected between the rear sub-frame front plate and the rear sub-frame rear plate, and rear mounting position supporting plates are arranged on the rear sub-frame rear plate in a fixedly connected manner.

Further, there are a plurality of the vehicle body connecting parts and the battery pack guard plate connecting parts arranged on the rear sub-frame main body in a bilateral symmetry manner, and there are two groups of the stabilizing rod mounting parts, the upper control arm mounting parts and the lower control arm mounting parts all arranged on the rear sub-frame main body in a bilateral symmetry manner.

Further, the vehicle body connecting parts at least comprise vehicle body front mounting position supporting pipes fixedly connected with the rear sub-frame cross beams and the stabilizing rod mounting supports, and vehicle body rear mounting position supporting pipes fixedly connected with the rear sub-frame front plate and the rear mounting position supporting plates, and the vehicle body rear mounting position supporting pipes are disposed transversely penetrating through the rear sub-frame front plate.

Further, the battery pack guard plate connecting parts at least comprise guard plate outer mounting position threaded pipes fixedly connected with the lower supports and the rear sub-frame cross beams and penetrating through the lower supports and the rear sub-frame cross beams, and guard plate inner mounting position welding nuts arranged on the inner reinforcing plates in a fixedly connected manner.

Further, the stabilizing rod mounting parts comprise stabilizing rod mounting position welding nuts arranged on the stabilizing rod mounting supports in a fixedly connected way, and stabilizing rod mounting position threaded pipes fixedly connected to the stabilizing rod mounting supports and the rear sub-frame cross beams, and the stabilizing rod mounting position threaded pipes transversely penetrate through the rear sub-frame cross beams.

Further, the upper control arm mounting parts consist of front plate upper control arm mounting positions and rear plate upper control arm mounting positions correspondingly arranged on the rear sub-frame front plate and the rear sub-frame rear plate, and the lower control arm mounting parts consist of front plate lower control arm mounting positions and rear plate lower control arm mounting positions correspondingly arranged on the rear sub-frame front plate and the rear sub-frame rear plate.

Further, the positioning parts arranged on the two positioning supports are positioning holes, the positioning holes in one positioning support are round holes, and the positioning holes in the other positioning support are long-strip-shaped holes.

Compared with the prior art, the present disclosure has the following advantages:

The rear sub-frame assembly of the present disclosure may be easy to form and compact in structure due to the symmetric structure, thereby reducing the size and weight of the rear sub-frame assembly, and it may have a good use effect.

The above description is only the overview of the technical solutions of the present disclosure, implementation may be performed according to the content of the specification in order to more clearly understand the technical means of the present disclosure, and specific embodiments of the present disclosure are listed below in order to make the above and other objectives, features and advantages of the present disclosure more obvious and understandable.

BRIEF DESCRIPTION OF THE DRAWINGS

Accompanying drawings constituting a part of the present disclosure are used for further understanding the present disclosure, and schematic embodiments of the present disclosure and their description are used for explaining the present disclosure instead of improperly limiting it. In the drawings.

BRIEF DESCRIPTION OF REFERENCES OF THE DRAWINGS

Figure 1:
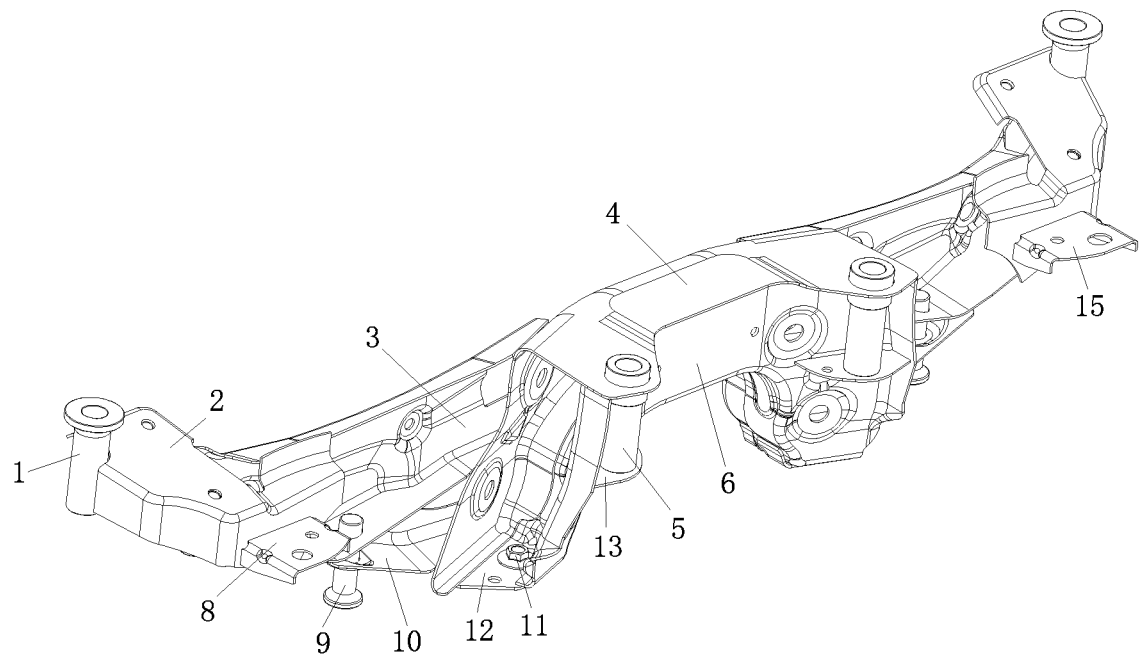
FIG. 1 is a structural schematic diagram of a rear sub-frame assembly in an embodiment of the present disclosure.

1—vehicle body front mounting position supporting pipe, 2—stabilizing rod mounting support, 201—thru hole, 3—rear sub-frame cross beam, 4—rear sub-frame front plate, 5—vehicle body rear mounting position supporting pipe, 6—rear sub-frame rear plate, 7—stabilizing rod mounting position threaded pipe, 8—main positioning support, 9—guard plate outer mounting position threaded pipe, 10—lower support, 11—guard plate inner mounting position welding nut, 12—inner reinforcing plate, 13—rear mounting position supporting plate, 1301—second through hole, 14—stabilizing rod mounting position welding nut, 15—auxiliary positioning support, 16—front plate upper control arm mounting position, 17—front plate lower control arm mounting position, 18—rear plate upper control arm mounting position, and 19—rear plate lower control arm mounting position.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompany drawings in the embodiments of the present disclosure. Obviously, the descried embodiments are part, not all of the embodiments of the present disclosure. Based on the embodiments in the present disclosure, all other embodiments obtained by those ordinarily skilled in the art without involving creative labor belong to the protection scope of the present disclosure.

It should be noted that the embodiments in the present disclosure and features in the embodiments may be mutually combined without conflicts.

The present disclosure may be illustrated in details below with reference to the drawings and the embodiments.

The embodiment relates to a rear sub-frame assembly, which is applied to an electric vehicle body, and mainly comprises a rear sub-frame main body and positioning supports.

Wherein, the rear sub-frame main body is a bilateral symmetry structure, and vehicle body connecting parts, battery pack guard plate connecting parts, stabilizing rod mounting parts, upper control arm mounting parts and lower control arm mounting parts are constructed on the rear sub-frame main body. The vehicle body connecting parts are constructed to be connected with the rear sub-frame main body on an upper portion of the rear sub-frame main body, and the battery pack guard plate connecting parts are constructed to be connected with the rear sub-frame main body on a lower portion of the rear sub-frame main body. In addition, the two positioning supports are arranged close to a left end and a right end of the rear sub-frame main body respectively, and the positioning parts matched with external positioning members to position the rear sub-frame main body are constructed on the two positioning supports respectively.

The rear sub-frame assembly in the embodiment may be easy to form and compact in structure due to the symmetric structure, thereby reducing the size and weight of the rear sub-frame assembly.

On this basis, an exemplary structure of the rear sub-frame assembly in the embodiment is shown in FIG. 1 to FIG. 4, wherein the rear sub-frame main body specifically comprises a rear sub-frame body, rear sub-frame cross beams 3, stabilizing rod mounting supports 2 and lower supports 10, the rear sub-frame body is located in a middle part of the rear sub-frame main body, and the rear sub-frame cross beams 3 and the stabilizing rod mounting supports 2 are arranged on the two opposite sides of the rear sub-frame body respectively. The positioning supports are fixedly connected to the stabilizing rod mounting supports 2 at the corresponding ends respectively, and the lower supports 10 are arranged and connected between the rear sub-frame cross beams 3 on the two sides and the rear sub-frame body.

Figure 2:
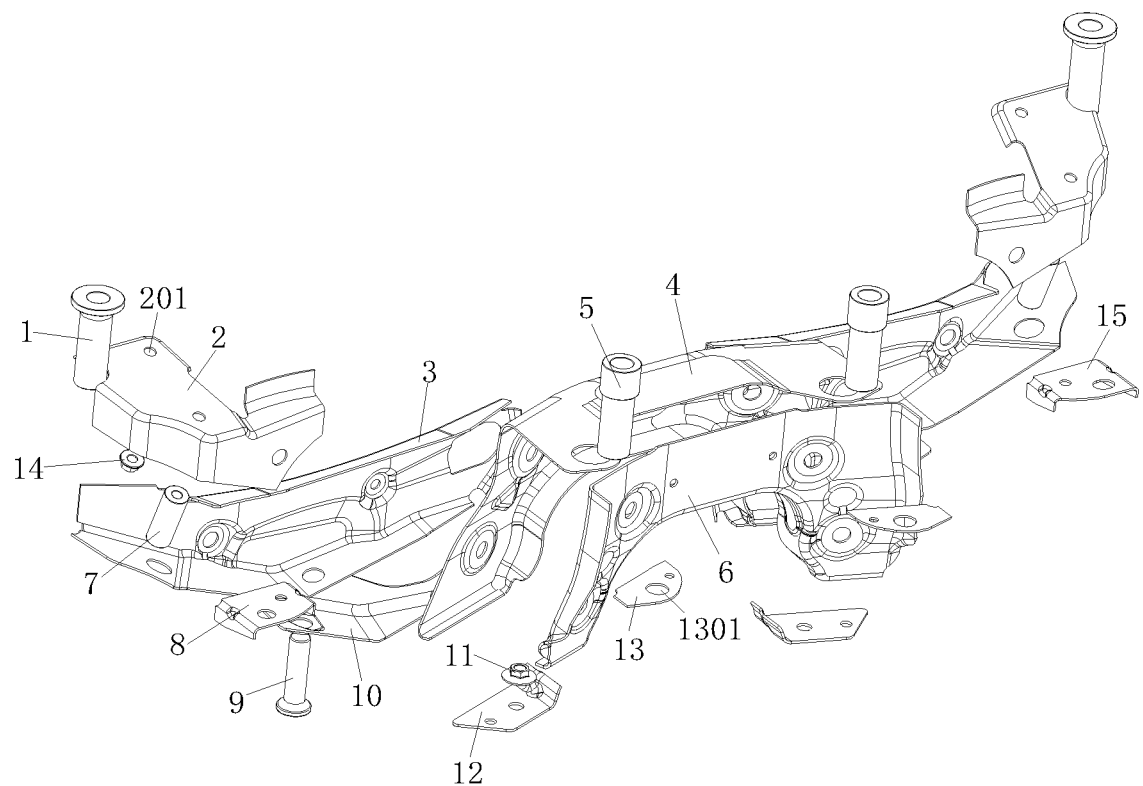
FIG. 2 is a decomposition explosive view of a rear sub-frame assembly in an embodiment of the present disclosure.

Specifically, as shown in FIG. 1 and FIG. 2, the rear sub-frame body in the embodiment is provided with a rear sub-frame front plate 4 and a rear sub-frame rear plate 6 which are fixedly connected together in a lapped way, wherein the rear sub-frame front plate 4 is approximately in an "L" shape overall, and comprises a vertical plate extending in a height direction of a vehicle, and a cross plate extending towards the tail of the vehicle in a length direction of the vehicle. In addition, two convex parts which are convex outwards and mutually symmetric are also formed on the cross plate, and first through holes allowing vehicle body rear mounting position supporting pipes 5 to penetrate are formed in the convex parts.

The rear sub-frame rear plate 6 in the embodiment is approximately of a platy structure bent towards the head direction of the vehicle overall, and its top is connected with the cross plate of the rear sub-frame front plate 4 in a lapped way. Wherein the amount of lap of between the rear sub-frame rear plate 6 and the rear sub-frame front plate 4 may be set at 4 mm preferably, and good rust prevention as well as reduction of overall weight may be achieved due to the arrangement. Of course, the specific number of the amount of lap may be correspondingly adjusted according to specific conditions besides 4 mm.

It needs to be noted that as shown in FIG. 1, in order to improve the use effect, inner reinforcing plates 12 are fixedly connected to the bottoms of the rear sub-frame front plate 4 and the rear sub-frame rear plate 6. Meanwhile, rear mounting supporting plates 13 are also fixedly connected to the positions, corresponding to the convex parts, of the bottom end of the rear sub-frame rear plate 6, and second through holes 1301 right opposite to the first through holes are formed in the rear mounting supporting plates 13.

In the embodiment, the rear sub-frame cross beams 3 on the two sides are both fixedly connected with the above rear sub-frame front plate 4 in a lapped way, and the lower supports 10 on the two sides are both arranged between the rear sub-frame front plate 4 and the bottoms of the rear sub-frame cross beams on the corresponding sides in a fixedly connected way. Wherein, the amount of lap between the rear sub-frame cross beams 3 and the rear sub-frame may also be set at 4 mm preferably, so as to improve rust prevention. Of course, the specific number of the amount of lap may be correspondingly adjusted according to specific conditions besides 4 mm.

Still as shown in FIG. 2, the rear sub-frame cross beams 3 in the embodiment are also approximately in an "L" shape overall, and specifically comprise cross beam main body arranged in the width direction of the vehicle, and bent parts bend and extend towards the head direction of the vehicle. In addition, flanges turned towards one side of the rear sub-frame front plate 4 are also formed at two ends of the upper end and the lower end of the rear sub-frame cross beams 3, the rear sub-frame cross beams 3 are fixedly connected with the rear sub-frame front plate 4 by the flanges in a lapped way, and the amount of lap between the rear sub-frame cross beams and the rear sub-frame front plate is also set at 4 mm preferably. In addition, in the embodiment, first mounting grooves for arranging vehicle body front mounting position supporting pipes 1 are also formed at the ends of the flanges at the lower ends of the rear sub-frame cross beams.

Still as shown in FIG. 1 and FIG. 2, the stabilizing rod mounting supports 2 in the embodiment are also in an "L" shape overall, and are fixedly connected with the cross beam main body and the bent parts of the rear sub-frame cross beams 3 respectively, so as to improve the arrangement stability of the stabilizing rod mounting supports 2. Moreover, in the embodiment, two thru holes 201 formed at intervals are also formed in the stabilizing rod mounting supports 2, so as to allow bolts and other external connectors to pass, and meanwhile second mounting grooves for arranging the vehicle body front mounting position supporting pipes 1 are also formed at the ends of the stabilizing rod mounting supports 2.

It needs to be noted that in the embodiment, in order to improve the use effect of the rear sub-frame assembly, there are a plurality of vehicle body connecting parts and battery pack guard plate connecting parts arranged on the rear sub-frame main body in a bilateral symmetry manner; and as a preferable embodiment, there are four vehicle body connecting parts and four battery pack guard plate connecting parts. In the embodiment, based on the structure and use performance of existing stabilizing rods and control arms, there are two groups of stabilizing rod mounting parts, upper control arm mounting parts and lower control arm mounting parts arranged on the rear sub-frame main body in a bilateral symmetry manner.

Wherein as shown in FIG. 1 and FIG. 2, the vehicle body connecting parts in the embodiment specifically comprise the vehicle body front mounting position supporting pipes 1 and the vehicle body rear mounting position supporting pipes 5, and the vehicle body front mounting position supporting pipes 1 are embedded into the first mounting grooves and the second mounting grooves and fixedly connected with the rear sub-frame cross beams 3 and the stabilizing rod mounting supports 2 respectively. The vehicle body rear mounting position supporting pipes 5 transversely penetrate through the rear sub-frame front plate 4, specifically penetrate into the above first through holes and the above second through holes 1301, and are also fixedly connected with the rear sub-frame front plate 4 and rear mounting position supporting pipes respectively.

It needs to be noted that the vehicle body connecting parts in the embodiment may also comprise other structures capable of connecting the rear sub-frame assembly and a vehicle body besides the vehicle body front mounting position supporting pipes 1 and the vehicle body rear mounting position supporting pipes 5.

Still as shown in FIG. 1 and FIG. 2, the battery pack guard plate connecting parts in the embodiment specifically comprise guard plate outer mounting position threaded pipes 9 and guard plate inner mounting position welding nuts 11. Wherein the guard plate outer mounting position threaded pipes 9 are arranged on the lower supports 10 and the rear sub-frame cross beams 3 in a penetrating manner and fixedly connected with the lower supports and the rear sub-frame cross beams, thus, the guard plate outer mounting position threaded pipes, the lower supports and the rear sub-frame cross beams may be connected to be one body, so as to effectively improve the overall rigidity of the rear sub-frame main body.

The guard plate inner mounting position welding nuts 11 are fixedly arranged on one side, facing the rear sub-frame front plate 4, of the inner reinforcing plates 12, via holes are also formed in the positions, corresponding to the guard plate inner mounting position welding nuts 11, of the inner reinforcing plates 12, and therefore bolts and other external connectors may be connected with the guard plate inner mounting position welding nuts 11 in a screwed manner by the via holes.

It needs to be noted that the battery pack guard plate connecting parts in the embodiment may also comprise other structures capable of connecting the rear sub-frame assembly and battery pack guard plates besides the guard plate outer mounting position threaded pipes 9 and guard plate inner mounting position threaded pipes.

The stabilizing rod mounting parts in the embodiment specifically comprise stabilizing rod mounting position welding nuts 14 and stabilizing rod mounting position threaded pipes 7, and the stabilizing rod mounting position welding nuts 14 are arranged corresponding to the above thru hole 201 close to the ends of the stabilizing rod mounting supports 2, and are fixedly connected to the lower surfaces of the stabilizing rod supports. The stabilizing rod mounting position threaded pipes 7 are arranged corresponding to the other thru hole 201, transversely penetrate through the flanges at the lower ends of the rear sub-frame cross beams 3, and meanwhile they are fixedly connected with the flanges and the stabilizing rod mounting supports 2.

Figure 3:
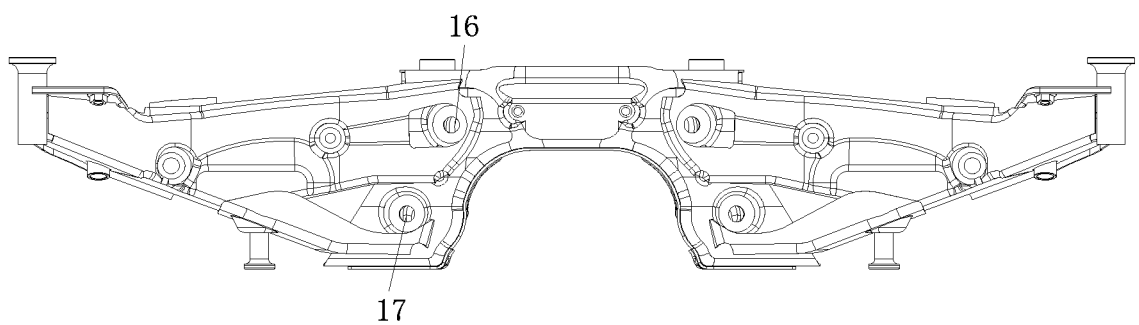
FIG. 3 is a left view of FIG. 1.
Figure 4:
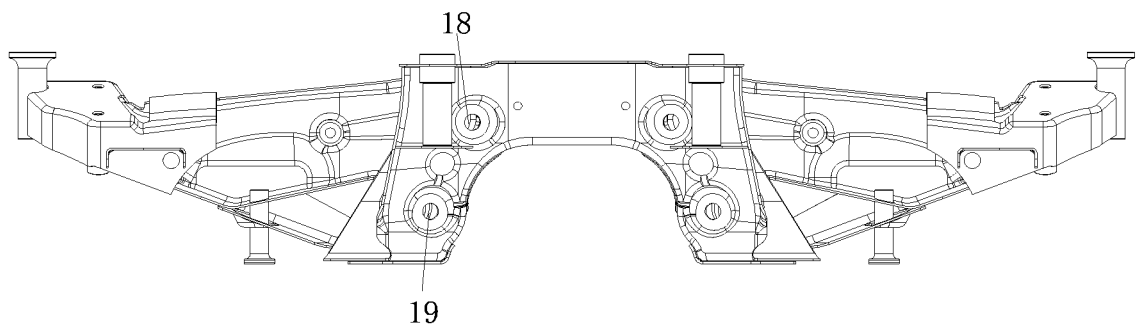
FIG. 4 is a right view of FIG. 1.

As shown in FIG. 3, FIG. 4 and FIG. 2, the upper control arm mounting parts consist of front plate upper control arm mounting positions 16 and rear plate upper control arm mounting positions 18 which are correspondingly arranged on the rear sub-frame front plate 4 and the rear sub-frame rear plate 6, and the two upper control arm mounting positions are located on the same height of the rear sub-frame main body, and both of them may be arranged as through holes. Similarly, the lower control arm mounting parts in the embodiment consist of front plate lower control arm mounting positions 17 and rear plate lower control arm mounting positions 19 which are correspondingly arranged on the rear sub-frame front plate 4 and the rear sub-frame rear plate 6, and the two lower control arm mounting positions are also located on the same height of the rear sub-frame main body, and both of them may be arranged as through holes similarly.

It needs to be noted that the mounting positions of control arms currently may also use other mounting structures commonly used by those skilled in the art besides the through holes.

The two positioning supports in the embodiment specifically comprise a main positioning support 8 on the left side and an auxiliary positioning support 15 on the right side, both of which have approximately identical overall structures and are fixedly connected to the lower portions of the rear sub-frame cross beams 3 on the corresponding sides respectively; and meanwhile, positioning parts formed in the two positioning supports are also positioning holes preferably. At this moment, the positioning parts specifically may use positioning pins, and as shown in FIG. 1, in order to conveniently mount the rear sub-frame assembly in the embodiment, the positioning holes in the main positioning support 8 may be round holes, and the positioning holes in the auxiliary positioning support 15 may be long-strip-shaped holes.

Based on the above overall description, the rear sub-frame assembly in the embodiment is compact in structure and light in weight, the overall rigidity of the rear sub-frame assembly may be effectively improved by connecting the upper end of the rear sub-frame assembly with the vehicle body by four mounting positions and connecting the lower end of the rear sub-frame assembly with the battery pack guard plates by four mounting positions, and therefore an electric vehicle with the rear sub-frame assembly may have good lateral rigidity and operational stability.

In addition, according to the rear sub-frame assembly in the embodiment, the stabilizing rods and the control arms may be conveniently mounted due to the arrangement of a plurality of fixing structures, and therefore the rear sub-frame assembly has a good use effect.

The above descriptions are merely the better embodiments of the present disclosure, which are not intended to limit the present disclosure. Any modification, equivalent replacement, improvement, etc. made within the spirit and principle of the present disclosure should fall within the scope of protection of the present disclosure.

The invention claimed is:

1. A rear sub-frame assembly, applied to an electric vehicle body, wherein the rear sub-frame assembly comprises:
a rear sub-frame main body, wherein the rear sub-frame main body is a bilateral symmetry structure, vehicle body connecting parts connected with the rear sub-frame main body on an upper portion of the rear sub-frame main body, and battery pack guard plate connecting parts connected with the rear sub-frame main body on a lower portion of the rear sub-frame main body are constructed on the rear sub-frame main body; and stabilizing rod mounting parts, upper control arm mounting parts and lower control arm mounting parts are further arranged on the rear sub-frame main body; and positioning supports, wherein the quantity of the positioning supports respectively arranged close to a left end and a right end of the rear sub-frame main body is two, and positioning parts matched with external positioning members to position the rear sub-frame main body are constructed on the two positioning supports respectively;

the rear sub-frame main body comprises a rear sub-frame body located in a middle part, and rear sub-frame cross beams and stabilizing rod mounting supports which are arranged on the two opposite sides of the rear sub-frame body respectively, and the rear sub-frame main body further comprises lower supports connected and disposed between the rear sub-frame cross beams on the two sides and the rear sub-frame body; and the positioning supports at the two ends are fixedly connected to the stabilizing rod mounting supports at the corresponding ends;

wherein the stabilizing rod mounting parts comprise stabilizing rod mounting position welding nuts fixedly connected with the stabilizing rod mounting supports, and stabilizing rod mounting position threaded pipes fixedly connected with the stabilizing rod mounting supports and the rear sub-frame cross beams, and the stabilizing rod mounting position threaded pipes transversely penetrate through the rear sub-frame cross beams.

2. The rear sub-frame assembly according to claim 1, wherein the rear sub-frame body is provided with a rear sub-frame front plate and a rear sub-frame rear plate which are fixedly connected together in a lapped way, the rear sub-frame cross beams on the two sides are both fixedly connected with the rear sub-frame front plate in a lapped way, and the lower supports on the two sides are both fixedly connected between the rear sub-frame front plate and the rear sub-frame cross beams the corresponding sides.

3. The rear sub-frame assembly according to claim 2, wherein inner reinforcing plates are fixedly connected between the rear sub-frame front plate and the rear sub-frame rear plate, and rear mounting position supporting plates are fixedly connected to the rear sub-frame rear plate.

4. The rear sub-frame assembly according to claim 3, wherein there are a plurality of the vehicle body connecting parts and the battery pack guard plate connecting parts arranged on the rear sub-frame main body in a bilateral symmetry manner, and there are two groups of the stabilizing rod mounting parts, the upper control arm mounting parts and the lower control arm mounting parts arranged on the rear sub-frame main body in a bilateral symmetry manner.

5. The rear sub-frame assembly according to claim 4, wherein the vehicle body connecting parts at least comprise vehicle body front mounting position supporting pipes fixedly connected with the rear sub-frame cross beams and the stabilizing rod mounting supports, and vehicle body rear mounting position supporting pipes fixedly connected with the rear sub-frame front plate and the rear mounting position supporting plates, and the vehicle body rear mounting position supporting pipes are disposed transversely penetrating through the rear sub-frame front plate.

6. The rear sub-frame assembly according to claim 5, wherein the rear sub-frame front plate is in an L shape; and
the rear sub-frame front plate comprises a vertical plate extending in a height direction of a vehicle, and a cross plate extending towards the tail of the vehicle in a length direction of the vehicle.

7. The rear sub-frame assembly according to claim 6, wherein two convex parts which are convex outwards and mutually symmetric are also formed on the cross plate; and
first through holes allowing the vehicle body rear mounting position supporting pipes to penetrate are formed on the convex parts.

8. The rear sub-frame assembly according to claim 7, wherein second through holes right opposite to the first through holes are formed on the rear mounting position supporting plates; and
the vehicle body rear mounting position supporting pipes penetrate through the first through holes and the second through holes, and are fixedly connected with the rear sub-frame front plate and the rear mounting position supporting plates.

9. The rear sub-frame assembly according to claim 5, wherein the rear sub-frame cross beams are in an L shape; and
the rear sub-frame cross beams comprise a cross beam main body arranged in a width direction of the vehicle, and bent parts bend and extend towards a head direction of the vehicle.

10. The rear sub-frame assembly according to claim 9, wherein flanges turned towards one side of the rear sub-frame front plate are also formed at two ends of the upper end and the lower end of the rear sub-frame cross beams; and
the rear sub-frame cross beams are fixedly connected with the rear sub-frame front plate by the flanges in a lapped way, and first mounting grooves for arranging the vehicle body front mounting position supporting pipes are formed at the ends of the flanges at the lower ends of the rear sub-frame cross beams.

11. The rear sub-frame assembly according to claim 10, wherein second mounting grooves for arranging the vehicle body front mounting position supporting pipes are also formed at the ends of the stabilizing rod mounting supports.

12. The rear sub-frame assembly according to claim 4, wherein the battery pack guard plate connecting parts at least comprise guard plate outer mounting position threaded pipes fixedly connected with the lower supports and the rear sub-frame cross beams and penetrating through the lower supports and the rear sub-frame cross beams, and guard plate inner mounting position welding nuts fixedly connected with the inner reinforcing plates.

13. The rear sub-frame assembly according to claim 1, wherein two thru holes interval arranged are formed in the stabilizing rod mounting supports;
the stabilizing rod mounting position welding nuts are arranged corresponding to the thru holes at the ends of the stabilizing rod mounting supports, and are fixedly connected to the lower surfaces of the stabilizing rod mounting supports; and
the stabilizing rod mounting position threaded pipes correspond to the other thru holes.

14. The rear sub-frame assembly according to claim 4, wherein the upper control arm mounting parts consist of front plate upper control arm mounting positions and rear plate upper control arm mounting positions which are correspondingly arranged on the rear sub-frame front plate the rear sub-frame rear plate, and the lower control arm mounting parts consist of front plate lower control arm mounting positions and rear plate lower control arm mounting positions correspondingly arranged on the rear sub-frame front plate and the rear sub-frame rear plate.

15. The rear sub-frame assembly according to claim 1, wherein the positioning parts arranged on the two positioning supports are positioning holes, the positioning holes in one positioning support are round holes, and the positioning holes in the other positioning support are long-strip-shaped holes.

16. The rear sub-frame assembly according to claim 1, wherein the positioning parts arranged on the two positioning supports are positioning holes, the positioning holes in one positioning support are round holes, and the positioning holes in the other positioning support are long-strip-shaped holes.

17. The rear sub-frame assembly according to claim 2, wherein the positioning parts arranged on the two positioning supports are positioning holes, the positioning holes in one positioning support are round holes, and the positioning holes in the other positioning support are long-strip-shaped holes.

18. The rear sub-frame assembly according to claim 3, wherein the positioning parts arranged on the two positioning supports are positioning holes, the positioning holes in one positioning support are round holes, and the positioning holes in the other positioning support are long-strip-shaped holes.

* * * * *